US012625394B2

(12) United States Patent　(10) Patent No.: US 12,625,394 B2
Xu et al.　(45) Date of Patent: May 12, 2026

(54) SWAPPABLE BATTERY FOR WEARABLE DEVICES

(71) Applicant: Meta Platforms Technologies, LLC, Menlo Park, CA (US)

(72) Inventors: Tianren Xu, San Jose, CA (US); Karthik Kadirvel, Cupertino, CA (US); Bradley Spare, San Jose, CA (US); Ankur Gupta, Redwood City, CA (US); Gregory Alan Roberts, Oakland, CA (US); Jason Howard, Alpharetta, GA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/602,792

(22) Filed: Mar. 12, 2024

(65) Prior Publication Data

US 2024/0337867 A1　Oct. 10, 2024

Related U.S. Application Data

(60) Provisional application No. 63/456,908, filed on Apr. 4, 2023.

(51) Int. Cl.
　G02C 11/00　(2006.01)
　G02B 27/01　(2006.01)
　　　(Continued)

(52) U.S. Cl.
　CPC .......... G02C 11/10 (2013.01); G02B 27/0176 (2013.01); H01M 10/425 (2013.01);
　　　(Continued)

(58) Field of Classification Search
　CPC ................ G02C 11/10; G02C 2200/08; G02C 2200/20; G02C 5/14; H01M 10/425;
　　　(Continued)

(56) References Cited

U.S. PATENT DOCUMENTS 6,824,265 B1 * 11/2004 Harper .................. G02C 11/04
　　　　　　　　　　　351/158
9,759,933 B1　9/2017 Lin
　　　　(Continued)

FOREIGN PATENT DOCUMENTS

AU　2005308671 A1　6/2006
CA　2588502 A1　6/2006
　　　(Continued)

OTHER PUBLICATIONS

International Preliminary Report on Patentability for International Application No. PCT/US2024/022764, mailed Oct. 16, 2025, 10 pages.

(Continued)

*Primary Examiner* — Christopher E Leiby
(74) *Attorney, Agent, or Firm* — Morgan, Lewis & Bockius LLP

(57)　ABSTRACT

A swappable battery and a swappable battery system for a near-eye device are described. In one aspect, the swappable battery may be detachably integrated into an outer surface of a near-eye device such that the swappable battery may be easily removable and replaceable by the user. In another aspect, the lid of the swappable battery may form an outer surface of the near-eye device when the swappable battery is attached. In some examples, the swappable battery may be detachably attached within a temple arm of a pair of smart-glasses such that the outer surface of the swappable battery and the outer surface of the temple arm are substantially contiguous and flush.

20 Claims, 5 Drawing Sheets

(51) Int. Cl.
  *H01M 10/42* (2006.01)
  *H01M 50/247* (2021.01)
(52) U.S. Cl.
  CPC ... *H01M 50/247* (2021.01); *G02B 2027/0154* (2013.01); *G02B 2027/0178* (2013.01); *G02C 2200/08* (2013.01); *G02C 2200/20* (2013.01); *H01M 2010/4271* (2013.01); *H01M 2220/30* (2013.01)
(58) Field of Classification Search
  CPC ....... H01M 50/247; H01M 2010/4271; H01M 2220/30; G02B 2027/0154; G02B 2027/0178; Y02E 60/10
  See application file for complete search history.

(56) References Cited

U.S. PATENT DOCUMENTS

| | | | |
|---|---|---|---|
| 9,971,171 | B1 | 5/2018 | Lin |
| 10,168,551 | B2 | 1/2019 | Blum et al. |
| 10,317,706 | B1 | 6/2019 | Lin |
| 10,826,068 | B2 | 11/2020 | Munaoka |
| 11,604,367 | B2 | 3/2023 | Tzvieli et al. |
| 2011/0234973 | A1* | 9/2011 | Ye .......................... G02C 11/10 351/158 |
| 2016/0109931 | A1* | 4/2016 | Kobayashi ........... G02B 27/017 345/212 |
| 2016/0372279 | A1* | 12/2016 | Yamazaki .......... G02B 27/0172 |
| 2017/0108713 | A1* | 4/2017 | Blum ................... H01R 33/945 |
| 2017/0108715 | A1* | 4/2017 | Bauer .................... G02C 11/10 |
| 2018/0138571 | A1 | 5/2018 | Kwak |
| 2018/0373057 | A1* | 12/2018 | Hino ................... H01M 50/256 |
| 2019/0369402 | A1 | 12/2019 | Woodman et al. |
| 2020/0110438 | A1* | 4/2020 | Brubacher .............. H04L 67/10 |
| 2020/0343775 | A1* | 10/2020 | Yahagi .................... H02J 50/12 |
| 2020/0383441 | A1* | 12/2020 | Kan ........................ A45C 13/02 |
| 2021/0074958 | A1 | 3/2021 | Pelletier et al. |
| 2021/0181517 | A1 | 6/2021 | DeMaio |
| 2021/0318558 | A1* | 10/2021 | Tzvieli ............... G02B 27/0093 |
| 2022/0019083 | A1 | 1/2022 | Woodman et al. |
| 2022/0155617 | A1* | 5/2022 | De Smet .................. G02C 5/08 |
| 2022/0357577 | A1* | 11/2022 | Ashwood ........... G02B 27/0093 |
| 2023/0315152 | A1* | 10/2023 | Jadidian ................ G06F 1/3296 361/601 |
| 2023/0408849 | A1* | 12/2023 | Legg .................... H01R 13/514 |

FOREIGN PATENT DOCUMENTS

| | | | |
|---|---|---|---|
| CN | 205193379 | U | 4/2016 |
| CN | 107534151 | A | 1/2018 |
| CN | 111208646 | A | 5/2020 |
| CN | 212181161 | U | 12/2020 |
| CN | 113534500 | A | 10/2021 |
| CN | 114035327 | A | 2/2022 |
| CN | 216083276 | U | 3/2022 |
| DE | 212017000283 | U1 | 7/2019 |
| EP | 1842125 | B1 | 1/2012 |
| EP | 3282508 | A1 | 2/2018 |
| JP | WO2017002288 | A1 | 4/2018 |
| JP | 2020013798 | A | 1/2020 |
| JP | 6652134 | B2 | 2/2020 |
| JP | 6795069 | B2 | 12/2020 |
| KR | 20070101254 | A | 10/2007 |
| KR | 20180025841 | A | 3/2018 |
| WO | 2006056744 | A1 | 6/2006 |
| WO | 2017002288 | A1 | 1/2017 |
| WO | 2018126117 | A1 | 7/2018 |
| WO | 2021208505 | A1 | 10/2021 |

OTHER PUBLICATIONS

International Search Report and Written Opinion for International Application No. PCT/US2024/022764, mailed Jun. 27, 2024, 15 pages.

* cited by examiner

100

TEMPLE 106L

SWAPPABLE BATTERY 101

FRAME 105

TEMPLE 106R (OPTIONAL) DISPLAY 110

400

BATTERY LID
425

BATTERY MANAGEMENT
UNIT (BMU)
450

ELECTRICAL
CONNECTOR
427

ELECTROLYTE PLUG
423

BATTERY ENCLOSURE
420

400

BATTERY LID
425

BATTERY MANAGEMENT
UNIT (BMU)
450

BATTERY ELECTRICAL
CONNECTION
460

ELECTROLYTE PLUG
423

BATTERY ENCLOSURE
420

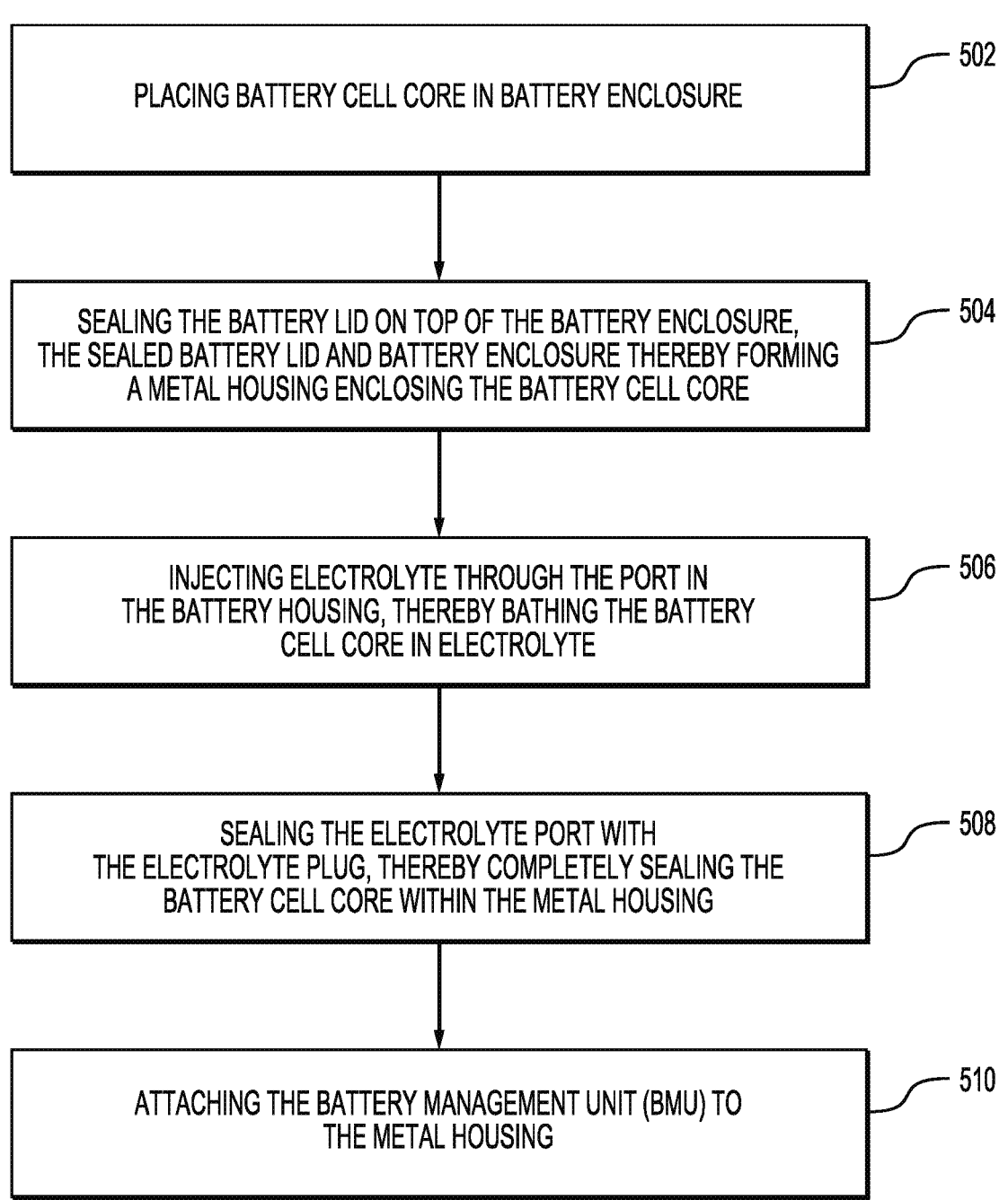

502 — PLACING BATTERY CELL CORE IN BATTERY ENCLOSURE

504 — SEALING THE BATTERY LID ON TOP OF THE BATTERY ENCLOSURE, THE SEALED BATTERY LID AND BATTERY ENCLOSURE THEREBY FORMING A METAL HOUSING ENCLOSING THE BATTERY CELL CORE

506 — INJECTING ELECTROLYTE THROUGH THE PORT IN THE BATTERY HOUSING, THEREBY BATHING THE BATTERY CELL CORE IN ELECTROLYTE

508 — SEALING THE ELECTROLYTE PORT WITH THE ELECTROLYTE PLUG, THEREBY COMPLETELY SEALING THE BATTERY CELL CORE WITHIN THE METAL HOUSING

510 — ATTACHING THE BATTERY MANAGEMENT UNIT (BMU) TO THE METAL HOUSING

*FIG. 5*

SWAPPABLE BATTERY FOR WEARABLE DEVICES

CROSS REFERENCE TO OTHER APPLICATIONS

This application claims priority to U.S. Prov. Pat. App. Ser. No. 63/456,908, entitled A DETACHABLE BATTERY FOR WEARABLE DEVICES and filed on Apr. 4, 2023, the entire contents of which are incorporated by reference.

TECHNICAL FIELD

This patent application relates generally to batteries used in wearable devices, and more specifically, to swappable batteries which may be integrated into near-eye display devices, and methods for manufacturing such swappable batteries.

BACKGROUND

With recent advances in technology, the prevalence and proliferation of content creation and delivery has increased greatly in recent years. In particular, interactive content such as virtual reality (VR) content, augmented reality (AR) content, mixed reality (MR) content, and content within and associated with a real and/or virtual environment (e.g., a "metaverse") has become appealing to consumers. To facilitate delivery of this and other related content, service providers have endeavored to provide various forms of wearable display systems. One such example may be a head-mounted display (HMD) device, such as a wearable eyewear, a wearable headset, or eyeglasses.

Wearable devices, such as virtual reality (VR), augmented reality (AR), and/or mixed reality (MR) glasses, smart-glasses, etc., may be fitted with one or more batteries to power mechanical, optical, and/or electrical components (e.g., sensors, cameras, illuminators, projectors, etc.) which perform the various functions of the wearable device. Such batteries may present many issues and concerns for user-friendly utilization of wearable devices. Such concerns include, for example, the relative ease and facility of battery charging and/or replacement, the constraints imposed by the relative size of the one or more batteries in relation to the entire wearable device, the efficiency of battery energy usage and retention, etc.

BRIEF DESCRIPTION OF DRAWINGS

Features of the present disclosure are illustrated by way of example and not limited in the following figures, in which like numerals indicate like elements. One skilled in the art will readily recognize from the following that alternative examples of the structures and methods illustrated in the figures can be employed without departing from the principles described herein.

FIG. 5 is a flow diagram of a method for manufacturing a swappable battery for a near-eye device, according to an example.

DETAILED DESCRIPTION

Figure 1:
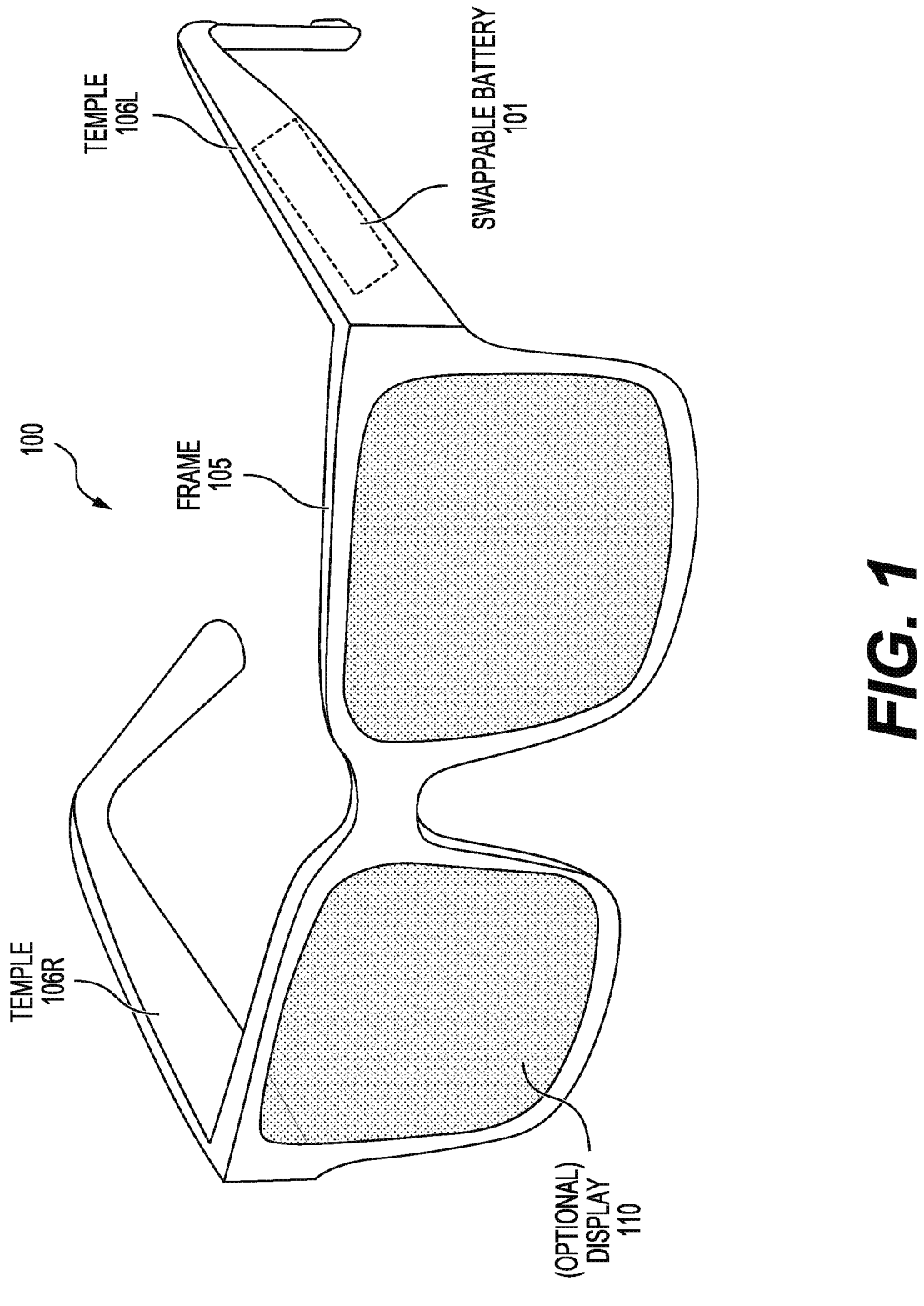
FIG. 1 illustrates a perspective view of a near-eye display device in the form of a pair of glasses, where a swappable battery is disposed in a temple of the near-eye device, according to an example.

For simplicity and illustrative purposes, the present application is described by referring mainly to examples thereof. In the following description, numerous specific details are set forth in order to provide a thorough understanding of the present application. It will be readily apparent, however, that the present application may be practiced without limitation to these specific details. In other instances, some methods and structures readily understood by one of ordinary skill in the art have not been described in detail so as not to unnecessarily obscure the present application. As used herein, the terms "a" and "an" are intended to denote at least one of a particular element, the term "includes" means includes but not limited to, the term "including" means including but not limited to, and the term "based on" means based at least in part on.

As used herein, a "near-eye device" may refer to any device (e.g., an optical device) that may be in close proximity to a user's eye. In some examples, a near-eye device may include a wearable headset or wearable eyewear, such as "smartglasses" which may provide audio and other content to the user, and may have sensors which sense either the local environment and/or the user, such as, e.g., an outward-facing camera. As used herein, a near-eye device may include a near-eye display device such as, e.g., a head-mounted display (HMD) device and/or a display device in the form of a pair of eyeglasses (sometimes referred to as "smartglasses") which may present, and possibly allow the user to interact with, virtual reality (VR), augmented reality (AR), and/or mixed reality (MR) environments, or any environment of real and virtual elements, such as a "meta-verse." As used herein, a "wearable device" may refer to any portable electronic device that may be worn on any body part of a user and used to present audio and/or video content, control other devices, monitor bodily functions, and/or perform similar actions. As used herein, a "user" may refer to a user or wearer of a "near-eye display device," a "near-eye device," and/or a "wearable device."

Batteries are a critical design component of near-eye devices. Battery replacement is problematic, because many typical near-eye devices have their batteries completely enclosed within the devices, making it difficult to replace such batteries. In addition, the high energy demand of near-eye devices may cause batteries to degrade more quickly, especially near-eye display devices which may have high energy demands for their display components. More-over, regulatory requirements are being implemented which may require consumer electronics, including wearable devices such as near-eye devices and near-eye display devices, to be capable of user-friendly battery replacement. For example, in Europe, European Union (EU) Battery Regulations are being promulgated which require, among other things, that batteries for consumer electronics be removable/replaceable by the consumer/end-user at any point during the lifetime of the product. See, e.g., E.U. Regulation 2023/1542 of 12 Jul. 2023, which is incorporated by reference herein in its entirety.

In some examples of the present disclosure, a swappable battery is provided for near-eye and other wearable devices (including, for example, near-eye display devices). In some examples, the swappable battery may include a housing which forms part of the exterior surface of the near-eye device, thereby increasing the internal space available for internal components (such as, e.g., operational circuitry as well as the battery cell core itself), making assembly of the near-eye device more efficient and simpler, and facilitating accessibility of the swappable battery for replacement thereby, for example, removing the need to remove or otherwise manipulate other components of the near-eye device. For instance, a user of a near-eye device in some examples may relatively easily remove and replace a swappable battery, despite lacking any technological expertise.

In some examples of the present disclosure, a swappable battery system for near-eye devices is provided. In some examples, a swappable battery may include a battery enclosure sealed with a battery lid forming a housing for enclosing a battery cell core, where, when the swappable battery is attached to the near-eye device, the battery lid comprises a portion of a surface wall of a temple of the near-eye display device, thereby integrating the swappable battery into the near-eye device while also keeping the swappable battery easily accessible from the outside.

In some examples, a non-operable swappable battery may be detached/removed with relative ease, and may be replaced with an operable swappable battery by insertion/attachment. In some examples, the battery management unit (BMU) may be integrated into the swappable battery. In some examples, the battery cell core inside the swappable battery may also be replaceable, thereby making the battery enclosure reusable by replacing a spent interior battery cell core. In some examples, the swappable battery may be re-chargeable as well as replaceable.

In its most general aspect, a "battery cell core" may be considered any electrically operative structure including at least one positive electrode, at least one negative electrode, and at least one separator (i.e., electrically insulating sheet) between the positive and negative electrodes, as would be understood by one of ordinary skill in the art. In some examples, the separator may be a porous, polymeric membrane, wet/moistened with electrolyte. The exact characteristics, parameters, and structure of the battery cell core may vary in various examples in accordance with the present disclosure, depending on, for example, the type of battery cell(s); the type of electrolyte(s) and/or materials used; the size and nature of the swappable battery (which may vary depending on its location, whether it is powering the near-eye device all or in part, how it is detachably attached to the near-eye device, etc.); the size and nature of the near-eye device in which the swappable battery may be detachably attached; etc. In some examples, a "dry" swappable battery, and thus a "dry" battery cell core (such as, e.g., a "solid-state" battery core), may be employed in accordance with the present disclosure. It is intended that any future battery cell technological improvements (whether electrical, chemical, structural, or even more fundamental) may be employed in accordance with the present disclosure by making any appropriate/suitable modifications to the design and description herein, as would be understood by one of ordinary skill in the art.

As used herein, the term "swappable" is intended to be interpreted in the broadest possible manner, depending on the context of its usage. Roughly speaking, the term "swappable battery" may mean that a detachable/replaceable battery is relatively easy to attach and/or replace, and thus a user may do so with relatively little technological training or knowledge. Accordingly, in some examples, a user may simply "pop out" a spent swappable battery from a near-eye device and then "pop in" a new, operable swappable battery. As used herein, the term "swappable" may be used interchangeably with "detachable" or "replaceable," depending on the context.

While some advantages and benefits of the present disclosure are discussed herein, there are additional benefits and advantages which would be apparent to one of ordinary skill in the art.

FIG. 1 illustrates a perspective view of a near-eye device in the form of a pair of glasses, where a swappable battery is disposed in a temple of the near-eye display device, according to an example. While the example shown in FIG. 1 is a near-eye display device in the form of a pair of glasses, other examples may be other forms of head-mounted display (HMD) devices or other wearable devices. For instance, the near-eye device may be a pair of "smartglasses" which include lenses which may not show anything but the external environment (i.e., may not include any form of image display and/or image projector for the user's eyes), or lenses which may show only comparatively limited and relatively simpler information, such as text, icons, color changes, etc., rather than comparatively detailed and/or moving images. It is intended the present disclosure includes near-eye devices with image display technology, near-eye devices with no image display technology, and any near-eye device which falls on the spectrum between the two, in terms of what may be indicated visually to the user.

In some examples, the near-eye device 100 may include a frame 105, right and left temples 106R and 106L, respectively, and an optional display 110. In some examples, the lens of the near-eye device 100 may not include a display. The optional display 110 may be configured to present media or other content to a user, or may be configured to operate as a virtual reality (VR) display, an augmented reality (AR) display, and/or a mixed reality (MR) display. The optional display 110 may include display electronics and/or display optics. For example, the optional display 110 may include a transparent liquid crystal display (LCD) display panel, a transparent light-emitting diode (LED) display panel, or a transparent optical display panel (e.g., a waveguide display assembly). Other optical components may include waveguides, gratings, lenses, mirrors, etc. Electrical components may include sensors, a camera, illuminator(s), etc.

In some examples, the various sensors of the near-eye device 100 may include any number of depth sensors, motion sensors, position sensors, inertial sensors, and/or ambient light sensors, as shown. In some examples, the various sensors may include any number of image sensors configured to generate image data representing different fields of views in one or more different directions. In some examples, the various sensors may be used as input devices to control or influence the displayed content of the near-eye device 100, and/or to provide an interactive virtual reality (VR), augmented reality (AR), and/or mixed reality (MR) experience to a user of the near-eye device 100. In some examples, the various sensors may also be used for stereoscopic imaging or other similar application. A virtual reality engine (implemented on the near-eye device 100 or on another computing device and wirelessly coupled to the near-eye device 100) may execute applications within the near-eye device 100 and receive depth information, position information, acceleration information, velocity information, predicted future positions, or any combination thereof of the near-eye device 100 from the various sensors.

In some examples, the near-eye device 100 may further include one or more illuminator(s) to project light into a physical environment. The projected light may be associated with different frequency bands (e.g., visible light, infra-red light, ultra-violet light, etc.), and may serve various purposes. In some examples, the one or more illuminator(s) may be used as locators, which may be detectable by an external imaging device. This may be useful for the purposes of head tracking or other movement/orientation. It should be appreciated that other elements or components may also be used in addition or in lieu of such locators.

In some examples, the near-eye device 100 may also include a camera or other image capture unit. The camera, for instance, may capture images of the physical environment in the field of view. In some instances, the captured images may be processed, for example, by a virtual reality engine (implemented on the near-eye device 100 or on another computing device and wirelessly coupled to the near-eye device 100) to add virtual objects to the captured images or modify physical objects in the captured images, and the processed images may be displayed to the user by the optional display 110 for augmented reality (AR) and/or mixed reality (MR) applications.

In some examples, the near-eye device 100 may be implemented in any suitable form-factor, in addition to the pair of glasses shown in the figure, such as a head-mounted display (HMD) or other similar wearable eyewear or device. The near-eye device 100 may also include (not shown) one or more eye-tracking systems. As used herein, "eye tracking" may refer to determining an eye's position or relative position, including orientation, location, and/or gaze of a user's eye.

In examples according to the present disclosure, the near-eye device 100 may include a swappable battery 101. As shown in FIG. 1, the swappable battery 101 may be incorporated into an outer-facing surface of a body of the left temple 106L and the outwardly visible surfaces of the swappable battery 101 are contiguous and flush within the outer-facing surface of the body of the left temple 106L. In other examples, the swappable battery 101 may be incorporated instead into the inner-facing surface of the body of the left temple 106L, or the inner-facing or outer-facing surfaces of the right temple 106R, or any other possible surfaces of the temples 106L and/or 106R, as would be understood in light of the present disclosure by one of ordinary skill in the art. Accordingly, much of the description below will refer generally to "temple 106" for the sake of simplicity. As discussed further below, in other examples, the swappable battery 101 may be disposed in other locations, and may be incorporated as different portions of temple 106, as well as in other locations in the near-eye device 100.

In other examples, the swappable battery 101 may form, in the portion of the body of the temple 106 into which it is disposed, the entirety of the outer-facing surface of that portion of temple 106. For example, the swappable battery 101 may form an entire panel of the outer-facing surface of the left temple 106L and thus be contiguous with, and form edges on, the top and bottom surfaces of the left temple 106L. More generally, the swappable battery 101 in other examples may form an entire panel of any of the surfaces of the frame and/or temples of the near-eye device 100. As shown and described in greater detail with reference to FIGS. 2A-2C below, the outwardly visible portion of the swappable battery 101 in FIG. 1 may be a top lid of the swappable battery 101.

Figure 2A:
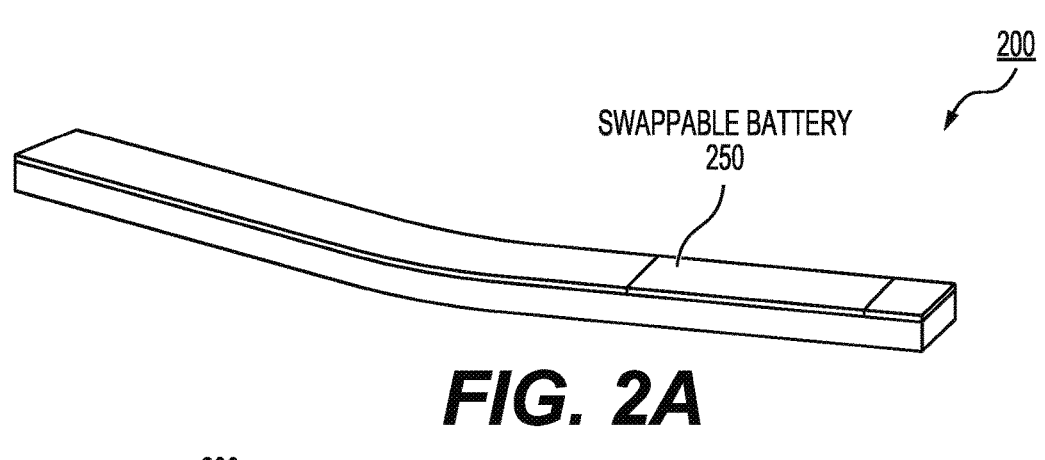
FIG. 2A illustrates a perspective view of a temple with a swappable battery in a near-eye device in the form of a pair of glasses, according to an example.
Figure 2B:
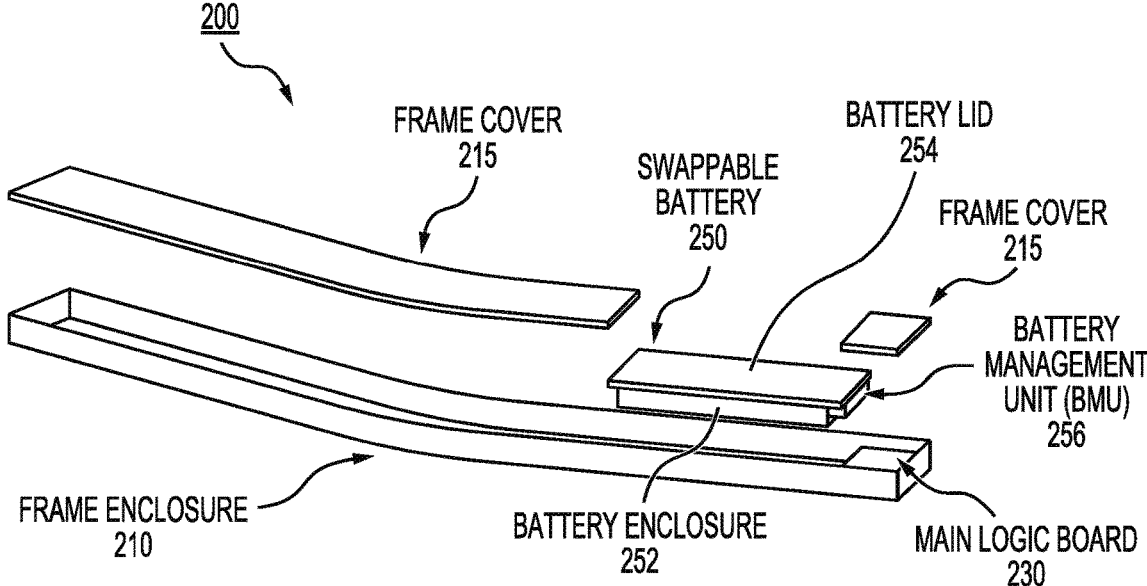
FIG. 2B illustrates an exploded perspective view of the swappable battery and other components in the temple of a near-eye device in the form of a pair of glasses in FIG. 2A, according to an example.
Figure 2C:
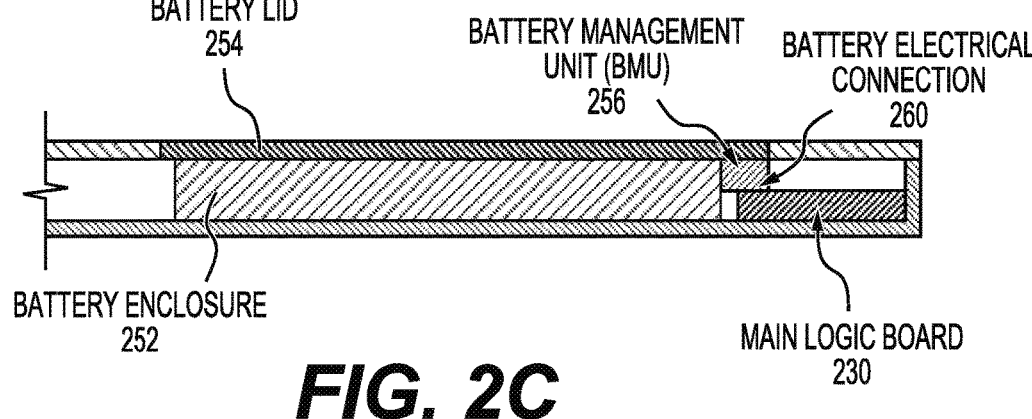
FIG. 2C illustrates a view of a cross-section of the temple fully assembled with the swappable battery of a near-eye device in the form of a pair of glasses in FIGS. 2A and 2B, according to an example.
Figure 3A:
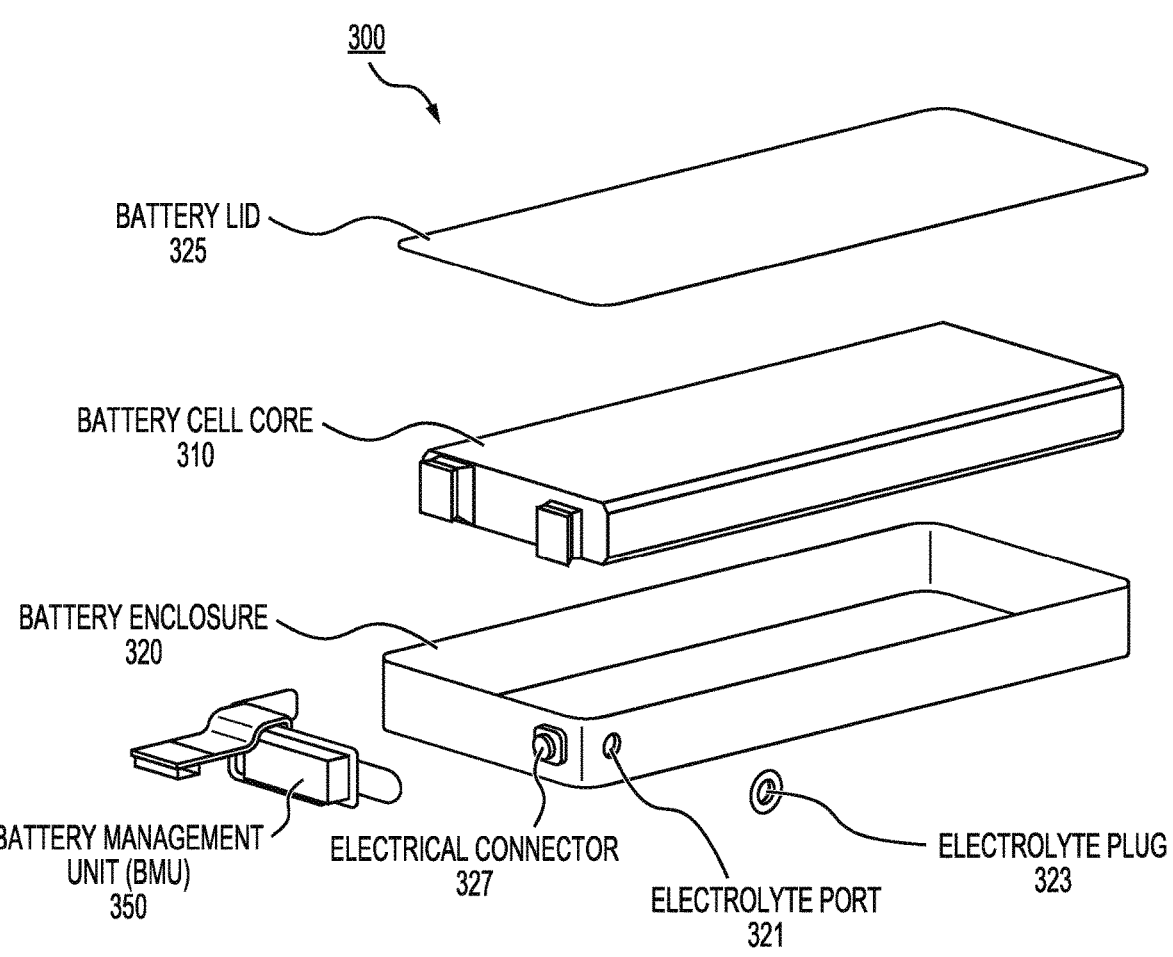
FIG. 3A illustrates an exploded perspective view of a swappable battery and its components, which may be detachably integrated into a temple of a near-eye device in the form of a pair of glasses, according to an example.
Figure 3B:
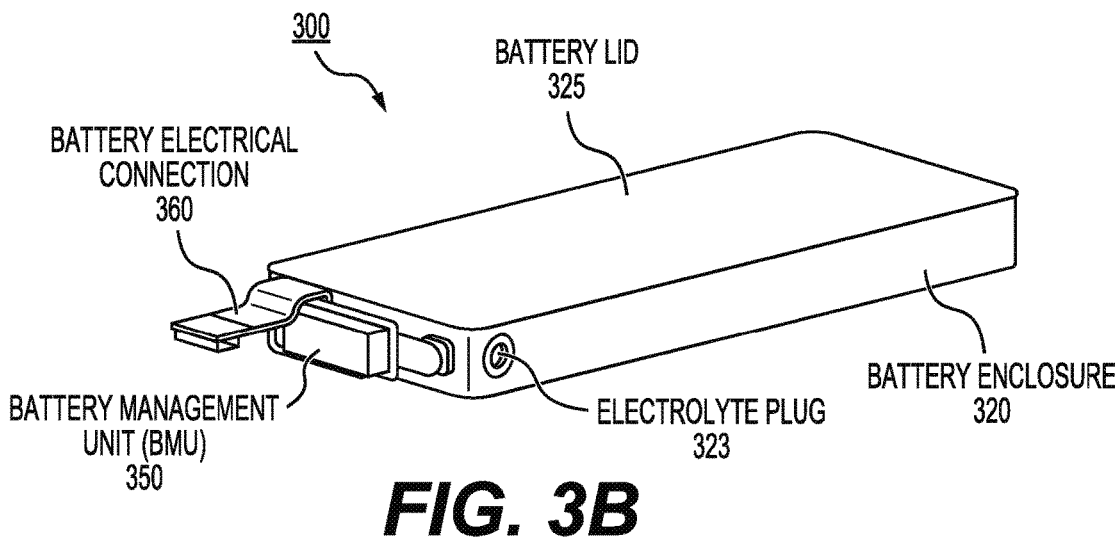
FIG. 3B illustrates a perspective view of the swappable battery and components of FIG. 3A, once fully assembled, according to an example.
Figure 4A:
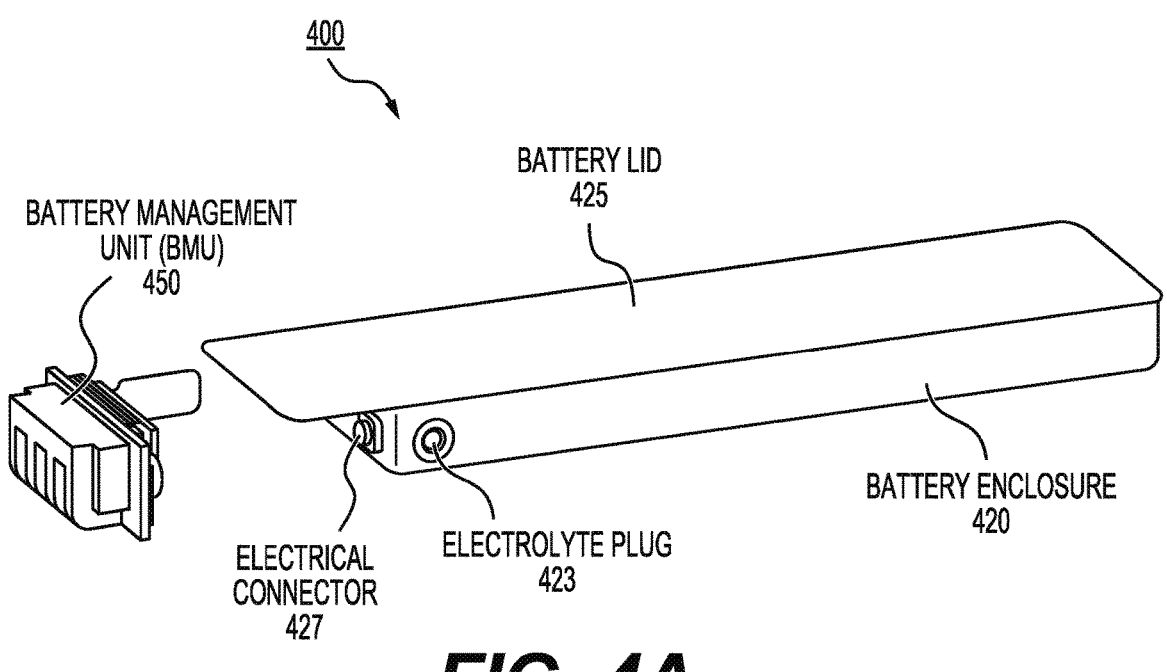
FIGS. 4A and 4B illustrate perspective views of a swappable battery with a blade type of battery electrical connection, which may be detachably integrated into a temple of a near-eye device in the form of a pair of glasses, according to an example.
Figure 4B:
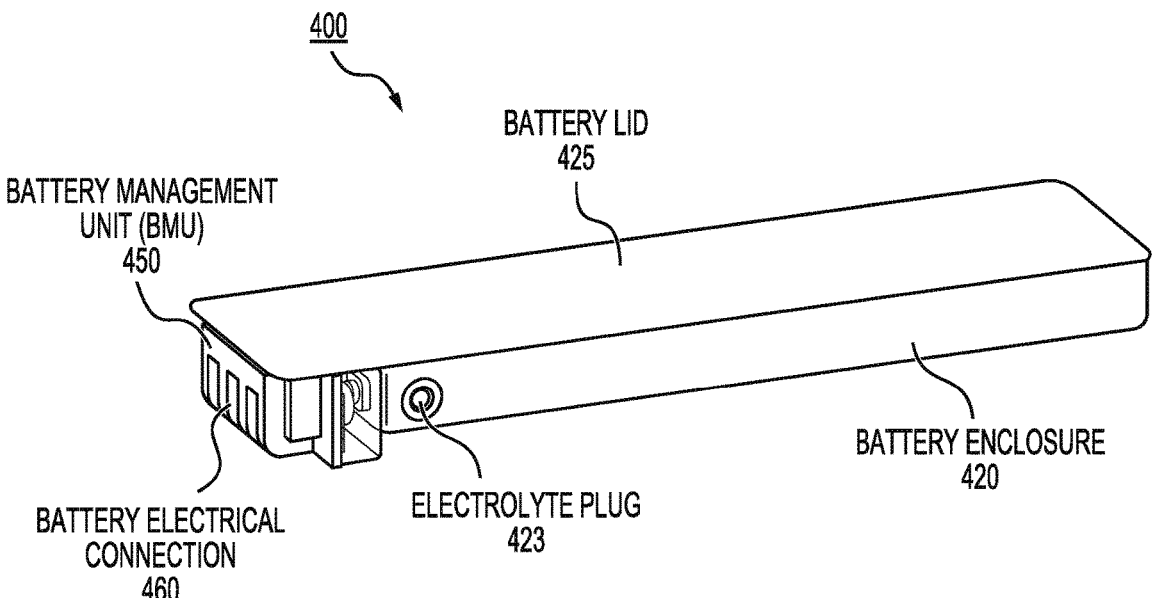

In some examples, such as shown in FIGS. 2A-2C below, the swappable battery 101 may include a battery housing which may, in turn, include a battery enclosure for holding a battery cell core and a battery lid for sealing in the battery cell core, where the battery lid is larger than the top of the battery enclosure and forms part of the exterior surface of the near-eye display device. In such examples, the swappable battery 101 may be disposed within the temple 106, and the battery lid may form a surface of that temple, thereby covering the rest of the battery parts as well as the other internal components disposed inside the temple. In other examples, such as shown and described in reference to FIGS. 3A-3B and FIGS. 4A-4B below, the swappable battery 101 may include a battery housing including a battery lid which is flush with the top of the battery enclosure. In such an example, as shown in FIGS. 3A-3B, the battery lid may not cover the rest of the battery parts, such as, e.g., the battery management unit (BMU). In other examples, such as shown in FIGS. 4A-4B, the battery lid may cover the battery and all components including the battery management unit (BMU).

In some examples, because part of the swappable battery 101 forms the outside of the outer-facing surface of the temple 106, more room is available within the interior of temple 106, thereby allowing the swappable battery 101 to be larger than most typical batteries which are fully enclosed within the sides of the frame of the temple 106. In this manner, examples of the present disclosure both save space and increase battery size. For instance, in typical near-eye display devices, the wall of the temple is about 1 millimeter thick. Thus, in such examples as described herein, the interior space of the temple would have an additional millimeter of space. If such extra space is used by the battery, the resulting battery would be about 1 millimeter thicker than the batteries in typical near-eye display devices. Such an increase may represent as much as a 25% increase in volume and thickness in comparison to batteries in typical near-eye display devices.

In some examples, the swappable battery 101 may include a metal housing which both forms part of the exterior surface of a near-eye display device and holds the battery cell core. In some examples, the metal housing may provide additional mechanical strength, durability, and resilience to the swappable battery 101 as a whole, thereby increasing, for example, its suitability/robustness for being physically removable and replaceable by a user. In such examples, the metal housing may act as a heat sink for dissipating excess heat through the exterior surface, thereby providing additional flexibility, durability, and resilience to the near-eye device 100 as a whole. In such examples, the metal housing may also serve as an electrode (e.g., anode or ground) for the swappable battery 101, thereby eliminating the need for an additional wired connection.

In other examples, the swappable battery 101 may be incorporated into another portion of the temple 106 than that shown in FIG. 1, such as, for example, further backward or forward on the body of the temple 106, or disposed on an inner surface of the body of the temple 106. In other embodiments, the swappable battery 101 may be disposed in the tip of the body of the temple 106, or may comprise an entire portion of the body of the temple 106 (such as, e.g., the entire tip). In other examples, the swappable battery 101 may be disposed differently in the body of the temple 106. In such examples, the swappable battery 101 may be disposed on the bottom surface of the temple 106 and its surface may extend only partway up the inner-facing and/or outer-facing surfaces of the temple 106, or the swappable battery 101 may be disposed on the top surface of the temple 106 and its surface may extend only partway down the inner-facing and/or outer-facing surfaces of the temple 106.

In other examples, the swappable battery 101 may comprise multiple swappable batteries which may be incorporated into either or both the right and left temples 106R and 106L. In an example such as shown in FIG. 1, where the swappable battery 101 is only on temple 106L of the near-eye device 100, it is possible the swappable battery 101 may cause a weight imbalance in the near-eye device 100. In some examples, a counterweight may be used in the other temple 106R, thereby balancing the load. In such an example, the counterweight may be another swappable battery 101, i.e., two swappable batteries 101 may be used, where one swappable battery 101 may be incorporated into the temple 106L, and the other swappable battery 101 may be incorporated into the other temple 106R, thereby evenly distributing the weight of the two swappable batteries 101 within the near-eye device 100. In further contemplated examples, the swappable battery 101 may be incorporated into other portions of near-eye device 100 besides or in addition to the right and/or left temples 106R and 106L.

As shown in FIG. 1, the swappable battery 101 is securely integrated into the left temple 106L of near-eye device 100. According to examples of the present disclosure, the swappable battery 101 may be removed by a user/consumer and replaced by another, similarly constructed battery. In some examples, as shown in FIG. 1, the surface of the swappable battery 101 extends all the way to, and includes a portion of, the top and bottom surfaces of the temple 106. In such examples, this "side" of the swappable battery 101, which is around a millimeter thick (i.e., the thickness of the wall of the temple 106), may be used by a user as leverage to remove the swappable battery 101 when it needs to be replaced.

In some examples, the swappable battery 101 may be held in place by one or more mechanical means/fasteners, such as, e.g., a packing, a gasket, or a seal. In some examples, a friction fit may be used such as, e.g., screws, clamps, a locking mechanism, and/or a snap-fit connection using, e.g., one or more hooks, plugs, protrusions, bulges, and/or other forms of detents (e.g., pegs and dowels) with corresponding one or more apertures, etc.—the variety of possible mechanical means/fasteners would be known by one of ordinary skill in the art, and the manner of implementation would vary depending on the materials used, the size and type of wearable display device, and other such parameters, as would also be understood by one of ordinary skill in the art. In other examples, the swappable battery 101 may be held in place by glue, tape, or some other form of adhesive (such as, e.g., Pressure Sensitive Adhesive (PSA) which may be removable/replaceable without tools, heat, etc.). In other examples, the swappable battery 101 may be held in place by electromagnetic and/or electromechanical means, such as, e.g., a magnetic seal or a ferroelectric seal. In some examples, the swappable battery 101 may be held in place by the use of specialty materials, such as a shape memory alloy (SMA).

In yet other examples, the swappable battery 101 may be held in place by a combination of different types of attachable/detachable means, whether frictional, adhesive-based, electrical, electronic, specialty materials, etc. For example, a Pressure Sensitive Adhesive (PSA) may be employed to hold the swappable battery 101 in place which is electrically removable by, e.g., applying a voltage thereto. In such an example, electronics within the near-eye device may be activated by user command to apply the appropriate voltage in place.

Although detachable and thereby replaceable with another similar battery, the swappable battery 101 in some examples may also be chargeable by wireless and/or wired connection to a power/energy source. Functions described herein may be distributed among components of the near-eye device 100 in a different manner than is described here. Furthermore, a near-eye device as discussed herein may be implemented with additional or fewer components than shown in FIG. 1.

FIG. 2A illustrates a perspective view of a temple with a swappable battery in a near-eye device in the form of a pair of glasses, according to an example. A simplified diagram of a temple 200 is shown in FIG. 2A, where the temple 200 is shaped differently than the temple 106 in FIG. 1. In terms of the present disclosure, the temple 200 may be either a left or a right temple. As shown in FIG. 2A, the swappable battery 250 is suitably disposed within the temple 200, thereby functioning as a cosmetic part of the temple 200.

FIG. 2B illustrates an exploded perspective view of the swappable battery and other components in the temple of a near-eye device in the form of a pair of glasses in FIG. 2A, according to an example. As shown in FIG. 2B, the temple 200 may have a frame enclosure 210. In the exploded view of FIG. 2B, it is apparent that the surface of the side of the frame of the temple 200 where the swappable battery 250 is disposed may comprise a battery lid 254 and a frame cover 215 consisting of the remaining two portions of the side frame surface. The swappable battery 250 may include the battery lid 254, a battery enclosure 252, and a battery management unit (BMU) 256. The battery management unit (BMU) 256 is a control unit which may monitor operating parameters, such as the voltage and temperature, of the swappable battery 250, as well as control and/or monitor the electrical connection between the swappable battery 250 and the electronics of the near-eye device. In some examples, the swappable battery 250 may not include the battery management unit (BMU) 256.

As shown in FIG. 2B, a main logic board 230 may be disposed within the frame enclosure 210 and may be directly adjacent to the swappable battery 250. The main logic board 230 may be a control unit which may control all, part, or some of the components in the near-eye device.

FIG. 2C illustrates a view of a cross-section of the temple fully assembled with the swappable battery of a near-eye device in the form of a pair of glasses in FIGS. 2A and 2B, according to an example. As shown in FIG. 2C, when fully assembled, the battery lid 254 may seal the swappable battery 250 into the frame enclosure 210 of the temple 200. In some examples, the battery lid 254 may be the portion of the swappable battery 250 that is mounted to the temple 200, thereby detachably connecting the swappable battery 250 to the temple 200.

As referred to above generally in reference to the swappable battery 101 in FIG. 1, in some examples, the swappable battery 250 may include a metal housing which both forms part of the exterior surface of a near-eye device and holds the battery cell core. In such examples, the metal housing may comprise the battery lid 254 sealed to the battery enclosure 252. In some examples, the metal housing formed by the battery lid 254 and the battery enclosure 252 may provide additional mechanical strength, durability, and resilience to the swappable battery 250 as a whole, thereby increasing, for example, its suitability/robustness for being physically removable and replaceable by a user. In such examples, the metal housing formed by the battery lid 254 and the battery enclosure 252 may act as a heat sink for dissipating excess heat through the exterior surface, thereby providing additional flexibility, durability, and resilience to the near-eye device as a whole. In such examples, the metal housing formed by the battery lid 254 and the battery enclosure 252 may also serve as an electrode (e.g., anode or ground) for the swappable battery, thereby eliminating the need for an additional wired connection.

In some examples, the metal comprising the housing, i.e., the battery lid 254 sealed to the battery enclosure 252, may be aluminum or steel such as stainless steel, with a mix of zinc, manganese, potassium, and graphite. As would be understood by one of skill in the art, the metal comprising the housing, i.e., the battery lid 254 sealed to the battery enclosure 252, according to examples of the present disclosure, may be made of at least one of, and/or an alloy of any one or combination of, molybdenum, nickel, osmium, palladium, platinum, potassium, rhenium, rhodium, selenium, silicon, silver, sodium, sulfur, tantalum, tin, titanium, tungsten, vanadium, zinc, and zirconium. In some examples, the metal comprising the housing, i.e., the battery lid 254 sealed to the battery enclosure 252, may be a ferroelectric material or a shape memory alloy (SMA). Steel, stainless steel, nickel plated steel, aluminum, aluminum alloys, titanium, titanium alloys, and similar ones may also be used.

As referred to above generally in reference to the swappable battery 101 being attached to the near-eye device 100, in some examples, the battery lid 254 in FIGS. 2B-2C may be mounted to the temple 200 by one or more mechanical means/fasteners, such as, e.g., a packing, a gasket, or a seal. In some examples, a friction fit may be used such as, e.g., screws, clamps, a locking mechanism, and/or a snap-fit connection using, e.g., one or more hooks, plugs, protrusions, bulges, and/or other forms of detents (e.g., pegs and dowels) with corresponding one or more apertures, etc.—the variety of possible mechanical means/fasteners would be known by one of ordinary skill in the art, and the manner of implementation would vary depending on the materials used, the size and type of wearable device, and other such parameters, as would also be understood by one of ordinary skill in the art. In other examples, the battery lid 254 may be mounted to the temple 200 by glue, tape, or some other form of adhesive (such as, e.g., Pressure Sensitive Adhesive (PSA) which may be removable/replaceable without tools, heat, etc.). In other examples, the battery lid 254 may be mounted to the temple 200 by electromagnetic and/or electromechanical means, such as, e.g., a magnetic seal or a ferroelectric seal. In yet other examples, the battery lid 254 may be held in place by a combination of different types of attachable/detachable means, whether frictional, adhesive-based, electrical, electronic, specialty materials, etc. For example, a Pressure Sensitive Adhesive (PSA) may be employed to hold the battery lid 254 in place which is electrically removable by, e.g., applying a voltage thereto. Alternatively, the electrically-removable PSA may be employed as a layer underneath the battery enclosure 252 to hold the swappable battery 250 in place. In such examples, electronics such as the BMU 256 may be activated by user command to apply the appropriate voltage to release the electrically-removable PSA holding the swappable battery 250 in place.

In some examples, the battery lid 254 in FIGS. 2B-2C may be mounted to the temple 200 and may be sealed using a gasket. In such examples, the gasket would more robustly meet the requirements of a wearable device, which may be exposed to multiple types of environments, from the humid and hot to the freezing, and to a wide variety of environmental conditions, such as, e.g., dust and rain, snow, or other moisture. Such a gasket may be a flat, soft, and/or solid sheet gasket and may be made from paper, rubber, silicone, metal, cork, felt, neoprene, nitrile rubber, fiberglass, polytetrafluoroethylene (PTFE), polychlorotrifluoroethylene (PCTFE), or other plastic polymer. Because the swappable battery may be in close proximity to a person's face, the gasket may be selected to be robust to skin oils and cosmetics such as sunscreen, lotions, perfume, etc.

As shown in FIG. 20, when fully assembled, the battery management unit (BMU) 256 of the swappable battery 250 may be electrically connected to the main logic board 230 by a battery electrical connection 260. In some examples, electrical connectors on the battery management unit (BMU) 256 and the main logic board 230 are mated during the manufacturing process and may be further re-connected when the swappable battery 250 is removed and replaced with a new swappable battery. In other examples, the swappable battery 250 is not directly electrically connected to the main logic board 230. In such examples, there may be a wide variety of ways in which the swappable battery 250 may be electrically connected to the system of electrical and electronic components to which it provides electrical power, as would be understood by one of skill in the art. In examples where the swappable battery 250 may not include battery management unit (BMU) 256, the swappable battery 250 may be similarly otherwise electrically connected to the system of electrical and electronic components to which it provides electrical power, and the near-eye device may or may not include a battery management unit (BMU).

As shown in FIGS. 2B and 2C, the battery lid 254 may be larger in width than the battery enclosure 252, thereby allowing it to function as the outer surface of that portion of the temple 200 while also enclosing and covering the internal components within frame enclosure 210. Having the battery lid 254 larger in width than the battery enclosure 252 also may facilitate assembly of the temple 200 during manufacturing. In other examples, such as shown and described in reference to FIGS. 3A-3B and FIGS. 4A-4B below, the battery lid is flush with the top of the battery enclosure and, as such, may not cover the rest of the battery parts, such as, e.g., the battery management unit (BMU).

As mentioned above, in some examples, because the battery lid 254 forms the outside of the surface/frame of the temple 200, more room is available within the interior of the temple 200, thereby allowing the swappable battery 250 to be larger than most typical batteries which are fully enclosed within the sides of the frame of the temple 200. For example, because the side of the frame of a typical temple is about 1 millimeter thick, the swappable battery 250 can be about 1 millimeter thicker than the typical battery, which may be in almost 25% increase in the size of the battery. In this manner, examples of the present disclosure both save space and increase battery size.

FIG. 3A illustrates an exploded perspective view of a swappable battery and its components, which may be detachably integrated into a temple of a near-eye device in the form of a pair of glasses, according to an example. As shown in FIG. 3A, a swappable battery 300 may include a battery cell core 310 which may be enclosed within a battery lid 325 and a battery enclosure 320, which may include an electrical connector 327 and an electrolyte port 321 into which an electrolyte plug 323 may be inserted. The electrical connector 327 may extend from inside the battery enclosure 320, through the wall of the battery enclosure 320, to outside the battery enclosure 320, thereby providing a direct electrical connection to the battery cell core 310 when fully assembled. In some examples, the swappable battery 300 may include battery management unit (BMU) 350, which may be directly connected to the electrical connector 327.

In some examples, both the battery lid 325 and the battery enclosure 320 may be comprised of metal. In such examples, the metal housing formed by the battery lid 325 and the battery enclosure 320 around the battery cell core 310 may provide additional mechanical strength, durability, and resilience to the swappable battery 300 as a whole, thereby increasing its suitability/robustness for being physically removed and replaced by a user. In such examples, the metal housing formed by the battery lid 325 and the battery enclosure 320 around the battery cell core 310 may act as a heat sink, thereby providing additional flexibility, durability, and resilience to the near-eye device as a whole. In such examples, the metal housing formed by the battery lid 325 and the battery enclosure 320 around the battery cell core 310 may serve as an electrode (e.g., anode or ground) for the swappable battery 300, thereby eliminating the need for an additional wired connection. In some examples, the metal housing formed by the battery lid 325 and the battery enclosure 320 around the battery cell core 310 may be in electrical connection with a negative terminal or a positive terminal of the battery cell core 310. In other examples, the metal housing formed by the battery lid 325 and the battery enclosure 320 around the battery cell core 310 may be insulated from the terminals of the battery cell core 310. The battery enclosure 320 may be either negative or positive. A pass through "rivet" of opposite polarity may include a metal conducting pole and gasket that insulates the pole from the enclosure and forms a seal between the interior and exterior of the battery enclosure. The gasket seal may be any insulating material, as discussed herein.

In some examples, after the battery lid 325 is sealed to the battery enclosure 320 in the manufacturing process, thereby enclosing the battery cell core 310 within, electrolyte may be injected through the electrolyte port 321, essentially activating the battery cell core 310. In such examples, after the electrolyte is finished being injected, the electrolyte plug 323 may be inserted into the electrolyte port 321, thereby completely sealing the battery cell core 310 and the electrolyte fluid within the housing formed by the battery enclosure 320 and the battery lid 325 (and the electrolyte plug 323).

FIG. 3B illustrates a perspective view of the swappable battery and components of FIG. 3A, once fully assembled, according to an example. As shown in FIG. 3B, the fully assembled swappable battery 300 may include a housing formed by the battery lid 325 and the battery enclosure 320 (and plugged by electrolyte plug 323), holding battery cell core 310 within (not shown), and the battery management unit (BMU) 350 physically and electrically connected to the electrical connector 327, thereby electrically connecting the battery management unit (BMU) 350 to the battery cell core

310 within. A battery electrical connection 360 physically and electrically connects the swappable battery 300 with the near-eye device.

As mentioned above, in some examples, because the battery lid 325 forms the outside surface of the temple of the near-eye device, more room is available within the interior of the temple, thereby allowing, for example, the battery cell core 310 to be larger than most typical battery cores which are fully enclosed within the interior of the temple. For example, because the side of the frame of a typical temple is about 1 millimeter thick, the battery cell core 310 can be about 1 millimeter thicker than the typical battery cell core, which may be in almost 25% increase in the size of the battery cell core. In this manner, examples of the present disclosure both save space and increase battery size.

As shown in FIGS. 3A-3B, the battery lid 325 does not cover the battery management unit (BMU) 350, unlike the example in FIGS. 2A-2C, in which the battery lid 254 covers the battery management unit (BMU) 256. In such examples, the manner of inserting, mounting, and detaching the swappable battery 300 may differ from the manner of inserting, mounting, and detaching the swappable battery 250 in FIGS. 2A-2C. For instance, since the hole in the wall of the temple frame is about the size of the battery lid 254, the swappable battery 300 may be inserted at an angle and sideways into the temple frame, in order that the battery management unit (BMU) 350 may be inserted inside the temple frame before closing and mounting the battery lid 254 onto the surface wall of the temple frame.

FIGS. 4A and 4B illustrate perspective views of a swappable battery with a blade type of battery electrical connection, which may be detachably integrated into a temple of a near-eye device in the form of a pair of glasses, according to an example. More specifically, FIG. 4A shows a swappable battery 400 with its battery management unit (BMU) 450 disconnected, while FIG. 4B shows the swappable battery 400 with the battery management unit (BMU) 450 connected. As shown in FIG. 4A, the swappable battery 400 may include a battery cell core 310 which may be enclosed within a battery lid 425 sealed to a battery enclosure 420, which forms a metal housing which may enclose a battery cell core (not shown). An electrical connector 427 may extend from the battery cell core inside the battery enclosure 420, through the wall of the battery enclosure 420, to outside the battery enclosure 420, thereby providing a direct electrical connection when a battery management unit (BMU) 450 is connected to the battery enclosure 420. As discussed above, an electrolyte plug 423 seals an electrolyte hole in the battery enclosure 420 after it is filled with electrolyte.

FIG. 4B illustrates a perspective view of the swappable battery 400 fully assembled with a blade type of battery electrical connection, according to an example. As shown in FIG. 4B, the fully assembled swappable battery 400 may include a housing formed by the battery lid 425, the battery enclosure 420 (plugged by electrolyte plug 423), and the battery management unit (BMU) 350 (electrically connected to the battery cell core), which also has a battery electrical connection 460 for physically and electrically connecting the swappable battery 400 with the near-eye device.

As shown in FIG. 4B, the battery electrical connection 460 may be in the form of a "blade" type of electrical connector, where three empty slots of the battery electrical connection 460 may be configured to mate with three corresponding "blades" or extensions inside the near-eye device (not shown) in order that the swappable battery 400 electrically connect with, and provide power to, the near-eye device when the swappable battery 400 is attached/inserted into the near-eye device. As mentioned above in reference to FIGS. 2A-2C, a large variety of battery electrical connections may be employed in accordance with the present disclosure, as would be understood by one of ordinary skill in the art. For instance, the battery electrical connection 360 in FIGS. 3A-3B may be in the form of a spring contact, while the battery electrical connection 260 of FIGS. 2A-2C may be in the form of one or more exposed contact pads. As another example, pins, such as pogo pin connectors, may be employed as the battery electrical connection between the swappable battery and the near-eye device.

FIG. 5 is a flow diagram of a method for manufacturing a swappable battery for a near-eye device, according to an example. The method 500 is provided by way of example, and is only one part of the entire manufacturing process. Each block shown in FIG. 5 may further represent one or more steps, processes, methods, or subroutines, as would be understood by one of ordinary skill in the art. For the sake of convenience and ease of explanation, FIG. 5 is described below in reference to the examples shown in FIGS. 3A-3B and 4A-4B.

At block 502, a battery cell core of a swappable battery may be placed within a battery enclosure. For example, the battery cell core 310 of the swappable battery 300 in FIGS. 3A-3B may be placed within the battery enclosure 320. At block 504, a battery lid may be sealed on top of the battery enclosure, whereby the sealed battery enclosure sealed by the battery lid may form a housing enclosing the battery cell core. For example, the battery lid 325 in FIGS. 3A-3B may be sealed on top of the battery enclosure 320, whereby the sealed battery enclosure 320 and battery lid 325 may form a housing enclosing the battery cell core 310. As detailed above, such a battery housing may be made from a metal, such as aluminum, nickel, and/or steel (e.g., stainless steel or nickel plated steel), possibly with a mix of zinc, manganese, potassium, and graphite, and/or any suitable metal, alloy, and/or specialty material, as would be understood by one of skill in the art.

At block 506, electrolyte may be injected through an electrolyte port in the battery enclosure, thereby bathing the battery cell core inside in electrolyte. For example, electrolyte may be injected through the electrolyte port 321 in the battery enclosure 320 in FIGS. 3A-3B, thereby bathing the battery cell core 310 in electrolyte. At block 508, the electrolyte port may be sealed with an electrolyte plug after the electrolyte injection process has finished, thereby completely sealing the battery cell core within the metal housing. For example, in FIGS. 3A-3B, the electrolyte port 321 may be sealed (e.g., by laser welding) with the electrolyte plug 323, thereby completely sealing the battery cell core 310 within the metal housing. In FIG. 4A, the electrolyte port has already been sealed with the electrolyte plug 423.

At block 510, a battery management unit (BMU) may be attached to the metal housing (which was formed by the battery lid being sealed to the battery enclosure with the battery cell core inside). For example, the battery management unit (BMU) 350 in FIGS. 3A-3B may be attached to the metal housing (i.e., the battery enclosure 320 sealed by the battery lid 325, with battery cell core 310 enclosed within); or. as shown in FIG. 4B, the battery management unit (BMU) 450 may be attached to the battery enclosure 420 under the battery lid 425. In some examples, the battery management unit (BMU) may be in direct contact with an electrical connector disposed in the side of the battery enclosure, thereby creating a direct electrical connection with the battery cell core. In some embodiments, the swappable battery may not include a battery management unit (BMU).

At the end of method 500, a swappable battery according to some examples may be fully assembled, comprising a battery enclosure enclosing a battery cell core, sealed by a battery lid on the top of the battery enclosure, together forming a metal housing, with an electrolyte plug sealing an electrolyte port, and a battery management unit (BMU) attached to the battery enclosure. In FIGS. 3A-3B, when the swappable battery 300 is fully assembled, the battery enclosure 320 may hold the battery cell core 310, and may be sealed at the top by the battery lid 325, thereby forming a metal housing, with the electrolyte plug 323 sealing the electrolyte port 321, and the battery management unit (BMU) 350 attached to the battery enclosure 320. In FIGS. 4A-4B, when the swappable battery 400 is fully assembled, the battery enclosure 420 holding a battery cell core (not shown) may be sealed at the top by the battery lid 425, thereby forming a metal housing, with the electrolyte plug 423 sealing an electrolyte port (not shown), and the battery management unit (BMU) 450 attached to the battery enclosure 420, fully underneath the battery lid 425, and having the blade-type battery electrical connection 460 for connecting to the electrical system of the near-eye device.

According to examples, a swappable battery for wearable devices is described herein. A swappable battery system for wearable devices is also described herein.

In the foregoing description, various inventive examples are described, including devices, systems, methods, and the like. For the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples.

The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example' is not necessarily to be construed as preferred or advantageous over other embodiments or designs.

What has been described and illustrated herein are examples and/or implementations of the disclosure along with some variations. The terms, descriptions, and figures used herein are set forth by way of illustration only and are not meant as limitations. Many variations are possible within the scope of the disclosure, which is intended to be only defined and/or otherwise by the following claims—and their equivalents—in which all terms are meant in their broadest reasonable sense unless otherwise indicated.

The invention claimed is:

1. A near-eye device, comprising:
   a frame;
   a temple connected to one end of the frame, the temple comprising a surface wall and a temple hole formed in the surface wall;

a swappable battery to detachably attach to the surface wall of the temple, the swappable battery housed within the temple hole when detachably attached to the surface wall of the temple, wherein the swappable battery comprises:

a battery housing fully assembled by a battery lid and a battery enclosure;

a battery cell core disposed in the battery enclosure; and the battery lid:

(i) to cover a top portion of the battery enclosure;

(ii) have a larger size than the top portion of the battery enclosure; and (iii) extends beyond the top portion of the battery enclosure such that, when the swappable battery is housed within the temple hole when detachably attached to the surface wall of the temple, the battery lid covers a logic board within the temple, the logic board configured to control electronic components of the near-eye device;

the battery lid forms a portion of the surface wall.

2. The near-eye device of claim 1, wherein the surface wall is on an inner surface or an outer surface of the temple.

3. The near-eye device of claim 1, wherein the battery enclosure and the battery lid are comprised of metal and form a metal housing.

4. The near-eye device of claim 3, wherein the metal housing is to act as a heat sink, dissipating heat from an interior of the temple.

5. The near-eye device of claim 3, wherein an outer surface of the battery lid of the metal housing is contiguous with the surface wall of the temple.

6. The near-eye device of claim 3, wherein the battery enclosure forms an electrical connection to a terminal of the battery cell core.

7. The near-eye device of claim 3, wherein the battery enclosure is insulated from an electrical connection to the battery cell core.

8. The near-eye device of claim 1, wherein the battery lid is detachably attached to the surface wall of the temple.

9. The near-eye device of claim 8, wherein the battery lid is detachably attached to the surface wall by a gasket.

10. The near-eye device of claim 8, wherein the battery lid is detachably attached to the surface wall by a mechanical connection.

11. The near-eye device of claim 1, wherein the swappable battery further comprises a battery management unit (BMU), and the battery lid extends over and covers the BMU.

12. The near-eye device of claim 11, wherein the swappable battery further comprises a battery electrical connection to form an electrical connection with the near-eye device.

13. The near-eye device of claim 12, wherein:

the battery electrical connection is to form an electrical connection between the logic board and the BMU.

14. The near-eye device of claim 1, wherein the near-eye device comprises a near-eye display device.

15. The near-eye device of claim 1, wherein the temple further comprises a battery management unit and the battery lid also covers the battery management unit.

16. The near-eye device of claim 1, wherein, when the battery housing is fully assembled by the battery lid and the battery enclosure, the battery cell core is sealed within the battery enclosure.

17. A swappable battery for a near-eye device comprising:

a battery housing fully assembled by a battery lid and a battery enclosure;

a battery cell core disposed in the battery enclosure; and the battery lid:

(i) to cover a top portion of the battery enclosure; and (ii) have a larger size than the top portion of the battery enclosure;

the battery lid forms a portion of a surface wall of a temple of the near-eye device, wherein:

the swappable battery is detachably attachable to the surface wall of the temple of the near-eye device by integrating into the surface wall such that the battery lid forms the portion of the surface wall, the temple includes a temple hole formed in the surface wall and the swappable battery is housed within the temple hole when detachably attached to the surface wall of the temple, and the battery lid extends beyond the top portion of the battery enclosure such that, when the swappable battery is housed within the temple hole when detachably attached to the surface wall of the temple, the battery lid covers a logic board within the temple, the logic board configured to control electronic components of the near-eye device.

18. The swappable battery of claim 17, further comprising:

a battery management unit (BMU) connected to the battery enclosure, wherein the battery lid extends over and covers the BMU.

19. A swappable battery system for a near-eye device comprising:

a frame;

a temple connected to one end of the frame, the temple comprising a surface wall and a temple hole formed in the surface wall; and a swappable battery to detachably attach to the surface wall of the temple, the swappable battery housed within the temple hole when detachably attached to the surface wall of the temple, wherein the swappable battery comprises:

battery housing fully assembled by a battery lid and a battery enclosure;

a battery cell core disposed in the battery enclosure; and the battery lid:

(i) to cover a top portion of the battery enclosure;

(ii) have a larger size than extend beyond the top portion of the battery enclosure; and (iii) extends beyond the top portion of the battery enclosure such that, when the swappable battery is housed within the temple hole when detachably attached to the surface wall of the temple, the battery lid covers a logic board within the temple, the logic board configured to control electronic components of the near-eye device;

the battery lid forms a portion of the surface wall, wherein:

the swappable battery is detachably attachable to the surface wall of the temple of the near-eye device by integrating into the surface wall such that the battery lid forms the portion of the surface wall.

20. The swappable battery system of claim 19, wherein the near-eye device comprises:

a display to present at least one of virtual reality (VR) content, augmented reality (AR) content, or mixed reality (MR) content.

* * * * *